Feb. 27, 1951 L. M. POTTS 2,543,199

MESSAGE NUMBERING APPARATUS

Filed Dec. 20, 1943 7 Sheets-Sheet 1

INVENTOR
LOUIS M. POTTS

BY H. B. Whitfield

ATTORNEY

Feb. 27, 1951 L. M. POTTS 2,543,199

MESSAGE NUMBERING APPARATUS

Filed Dec. 20, 1943 7 Sheets-Sheet 2

INVENTOR
LOUIS M. POTTS

BY H. B. Whitfield

ATTORNEY

Feb. 27, 1951 L. M. POTTS 2,543,199

MESSAGE NUMBERING APPARATUS

Filed Dec. 20, 1943 7 Sheets-Sheet 3

INVENTOR
LOUIS M. POTTS

BY H. B. Whitfield

ATTORNEY

Feb. 27, 1951 L. M. POTTS 2,543,199

MESSAGE NUMBERING APPARATUS

Filed Dec. 20, 1943 7 Sheets-Sheet 4

INVENTOR
LOUIS M. POTTS

BY H. B. Whitfield

ATTORNEY

Feb. 27, 1951 L. M. POTTS 2,543,199

MESSAGE NUMBERING APPARATUS

Filed Dec. 20, 1943 7 Sheets-Sheet 5

INVENTOR
LOUIS M. POTTS
BY H. B. Whitfield
ATTORNEY

MESSAGE NUMBERING APPARATUS

Filed Dec. 20, 1943 7 Sheets-Sheet 6

INVENTOR
LOUIS M. POTTS
BY
H. B. Whitfield
ATTORNEY

MESSAGE NUMBERING APPARATUS

Filed Dec. 20, 1943 7 Sheets-Sheet 7

INVENTOR
LOUIS M. POTTS
BY
H. B. Whitfield
ATTORNEY

Patented Feb. 27, 1951

2,543,199

UNITED STATES PATENT OFFICE 2,543,199

MESSAGE NUMBERING APPARATUS

Louis M. Potts, Evanston, Ill., assignor to Teletype Corporation, Chicago, Ill., a corporation of Delaware Application December 20, 1943, Serial No. 514,887

20 Claims. (Cl. 178—4)

The present invention relates to telegraphic message numbering systems and devices and more particularly to automatic apparatus for printing upon message forms at several stations serial numbers by which communication traffic between such stations may be periodically checked.

Based upon the established practice of commercial telegraph companies in numbering messages serially, and using number sheets for guarding against lost messages and for identifying corresponding copy at the two stations, it is now proposed in connection with automatic perforated control form transmission systems to provide collateral number printing apparatus which will correspondingly mark the transmitting and received message forms so that instant reference may be had to the related message bearing mediums through the identification number which marks the corresponding media at both the transmitting and the receiving stations.

Where messages are repeated through several stations as by the use of intermediate relaying or message rerouting apparatus this practice affords an especially effective tracing and checking medium which minimizes the probability of loss of messages such as might occur through misdirection or delay. In addition to these advantages, the provision of a serial number together with other identification markings to identify the messages transmitted by any particular one of a network of transmitting stations, affords a practice for assuring punctuality in servicing messages according to time preference or in accordance with the order of the messages as indicated by the sequential numbering system.

It is a principal object of the present invention to provide automatic numbering mechanism including apparatus embodiments at both retransmitting and receiving stations for mechanically imprinting upon message bearing media prepared thereat certain collateral information such as circuit designation and the messages' numerical sequence whereby each may be identified according to its order.

A further object of this invention is to provide an automatic system of supplying serial numbers or other designations to message bearing copy at both terminal stations of a communication system by means of locally operated mechanism and without the consumption of line time toward this endeavor except that at infrequent but regular intervals brief check signals are sent over the line which may or may not be reproduced upon the message record at the receiving station.

In accordance with auxiliary apparatus this identification number is periodically and automatically checked by means of verification devices. In disclosing the present invention there has been chosen an embodiment of tape transmitter such as is essentially similar to the one disclosed in U. S. Patent No. 2,296,845. The apparatus dicslosed in this patent is modified by the addition of a mechanical number stamp disposed so as to apply progressively changeable numbers on the face of the strip or ribbon upon which the message code perforations are made.

Through the mechanical operation of the numbering stamp its wheels are advanced ordinally, at predetermined periodic intervals. Also under the control of the numbering apparatus, a special signal is transmitted from the transmitting station to the receiving station verifying the order of the particular accompanying message.

For a more comprehensive understanding of the featured embodiments of this invention reference will now be had to the accompanying drawings and to the following detailed specification in which like reference characters designate corresponding parts throughout and in which.

Figure 3:
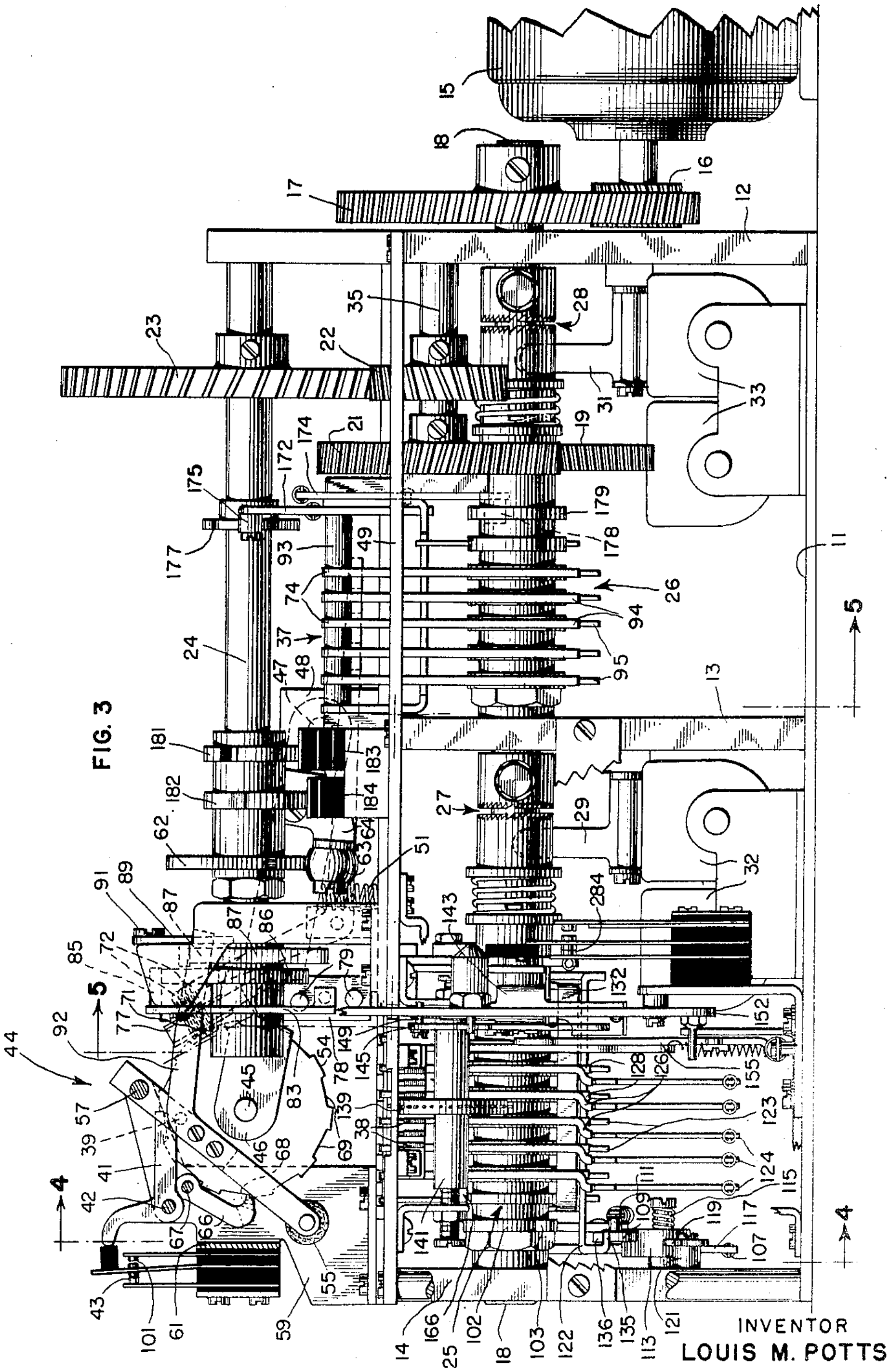
Fig. 3 is a side elevation of the apparatus featured in Figs. 1 and 2.
Figures 4, 5:
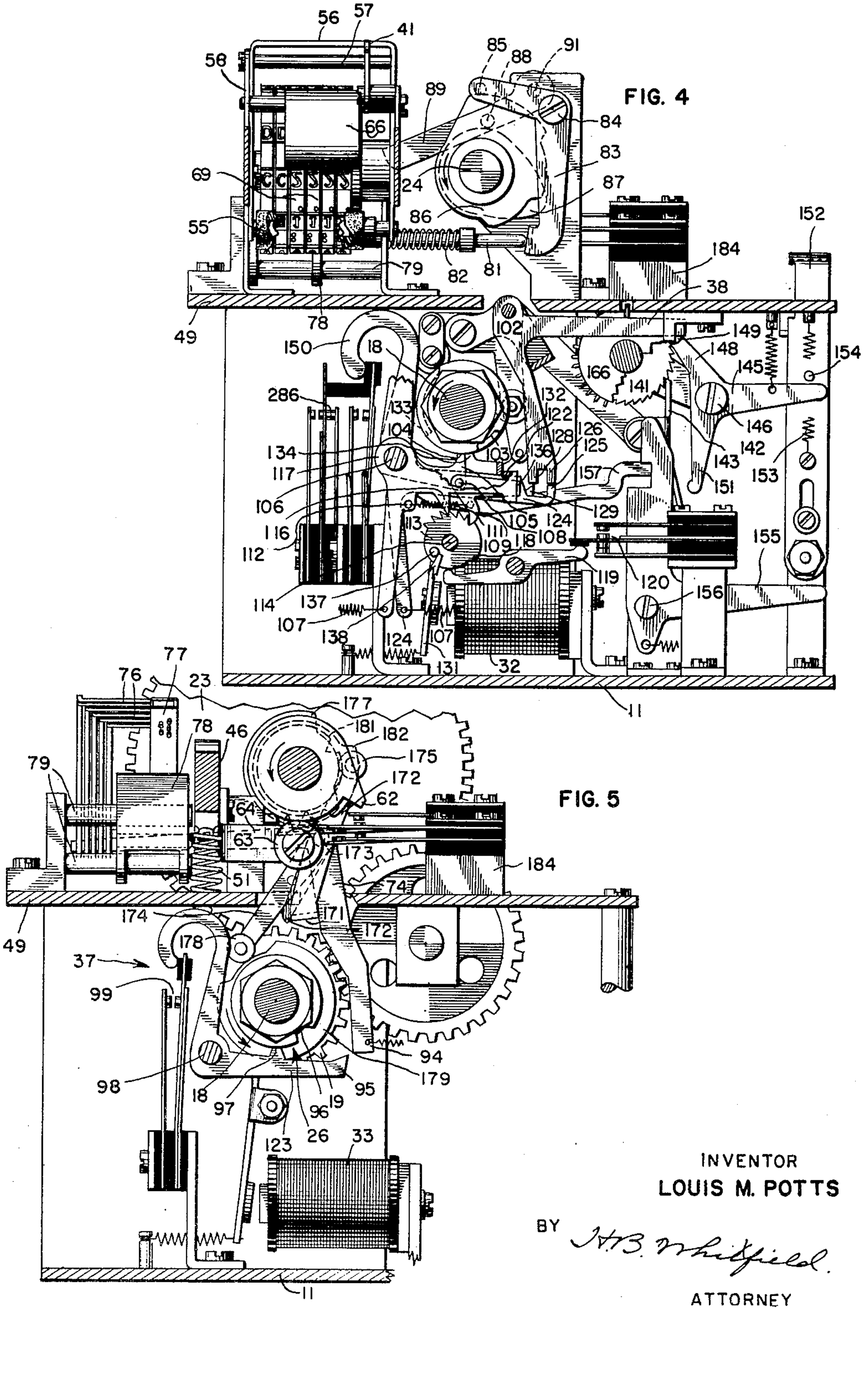
Fig. 4 is a transverse sectional view taken approximately on line 4—4 of Fig. 3.
Fig. 5 is a transverse sectional view taken approximately along the offset line 5—5 of Fig. 3.

Referring now more particularly to the accompanying drawings, reference character 11, Figs. 3 to 5, designates a lowermost supporting base upon which there are carried the three vertical supporting frames 12, 13, and 14. A prime mover 15 supplies rotary power to the transmitter by means of its driving pinion 16 which meshes with the principal driven gear 17 carried by the transmitter control shaft 18. From the transmitter control shaft 18 power is further communicated by means of the driving gear 19 to the jack shaft gear 21 whose companion driver 22 meshes with the large driven gear wheel 23 carried on the supervisory control shaft 24. In accordance with preferred practice, a speed reduction is effected between the transmitter shaft 18 and the supervisory control shaft 24 of the order of six to one.

The principal transmitting shaft 18 extends horizontally throughout the length of the transmitter unit and is journaled at its extremities in the end frames 14 and 12 and at its midsection in the intermediate frame 13. Generally stated, the object of shaft 18 is to impart rotation to the transmitting cam assemblies 25 and/or 26 when conditioned to do so. Transmitting cam assembly 25 is rotated under the supervision of a jaw clutch 27 which is released upon the actuation of its control armature 29 when impulsed by a magnet 32. A similar jaw clutch 28 correspondingly affecting cam assembly 26 is under the supervision of armature 31 which is impulsed by its associated magnet 33.

Supervisory control shaft 24 rotates only when clutch 28 is engaged, since gear 19 is carried by the sleeve of cam assembly 26. Throughout its length, shaft 24 carries several supervisory control cams which function to time and operate various parts of the message number unit and the special signal transmitting apparatus incident thereto, as will later be described. It will be understood that the rotation of shaft 24 is therefore dependent upon the energization of release magnet 33 which becomes energized when number signals are to be transmitted.

Figure 1:
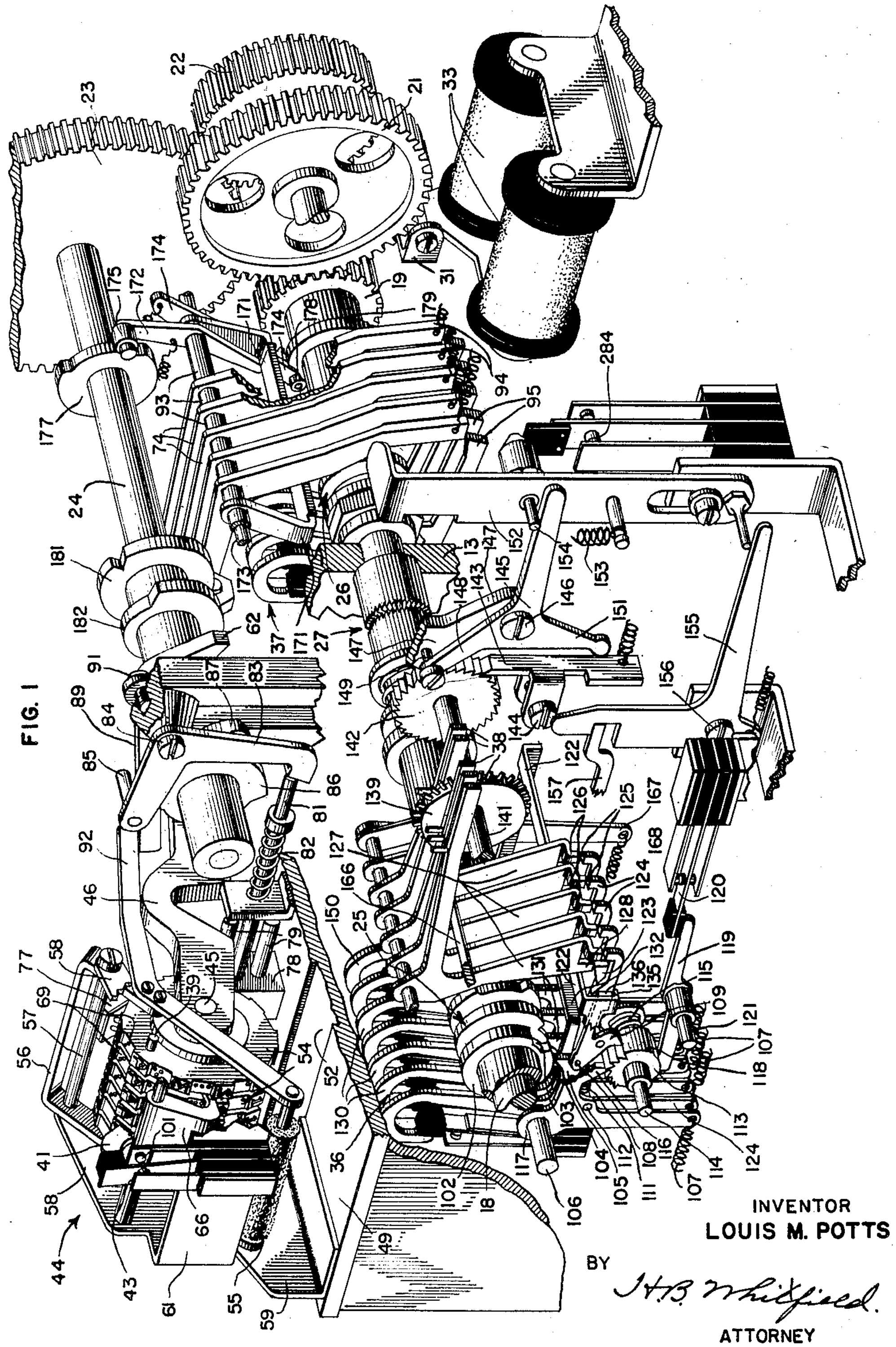
Fig. 1 is a perspective view of a transmitting station apparatus having applied thereto certain embodiments of the present invention and having foreground portions and other parts broken away to reveal features of the posterior structure.

Referring now more particularly to the illustration in Fig. 1 there will be noted two groups of transmitting gooseneck contacts designated 36 and 37. Of these the former is instrumental in transmitting the message subject matter which is sensed by the feeler levers 38 during the course of operation of the conventional tape transmitting mechanism, as disclosed in the above referred to U. S. patent. The group of transmitter goosenecks generally designated 37 is provided for the special purpose of sending the message number signals in accordance with the operation of the numbering stamp for the verification of the message serial number. The operation of transmitter 37 is periodically and automatically initiated coincident with the transmission of every tenth message, or in other words, when the control pin 39, Fig. 3, encounters the horizontal arm 41 of a contact control lever pivoted at 42 and upon such occasions is effective to close the contact pair 43.

Figure 2:
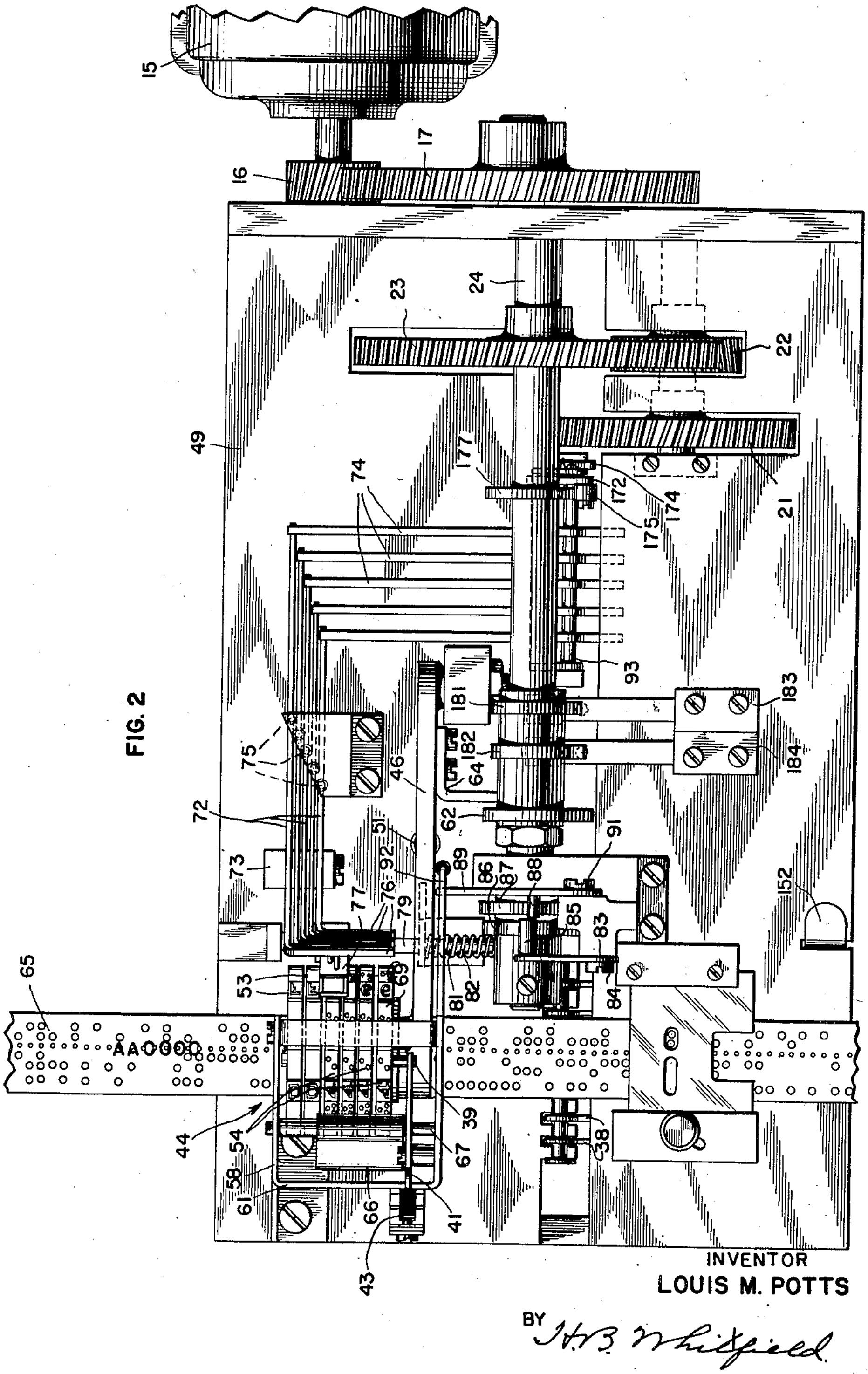
Fig. 2 is a plan view of the transmitting station apparatus featured in Fig. 1 illustrating a perforated control form in the position of signal transmission.

The message numbering stamp generally designated 44, Fig. 1, consists of a series of discs or wheels mounted on a horizontal supporting shaft 45 one end of which is secured in the free extremity of an arm 46 pivotally anchored at 47, Fig. 3, in a suitable bracket 48 upon the platform 49. A compression spring 51 situated beneath arm 46, as best seen in Fig. 5, imparts clockwise rotation to the arm 46, as viewed in Fig. 3, maintaining the shaft 45 in its uppermost position as indicated in Figs. 1 and 3 with the numbering wheels of the unit 44 poised above the channelway 52, Fig. 1, through which the control form 65 passes as it proceeds transversely of the unit, as best indicated in Figs. 1 and 2. As a matter of arbitrary illustration the stamp unit 44 is featured as having six numbering wheels, two of which designated 53 are assigned to the printing of an identification prefix that may have arabic numeral or alphabetical character designation, while the four designated 54, Fig. 2, carry the four integers of which each one is assigned to a decimal position.

The arm 46 is confined in its motion by a suitable stop in achieving its uppermost limit of movement, and while in this position the alignment of facets of its several printing wheels 53 and 54 are traversed during each printing cycle by an inking roller 55, Figs. 1, 3, and 4, which is carried by a yoke 56 pivoted on a shaft 57 so as to be reciprocable between two extreme positions.

Pivot shaft 57 is supported between an opposite pair of arms 58 integral with a formed sheet metal bracket generally designated 59, Fig. 1. The latter member stands upright upon the platform 49 and on an integrally formed strap 61 thereof carries the previously mentioned control contact set 43. At a certain time during the cyclic rotation of supervisory control shaft 24 a cam 62 carried thereon, Figs. 1 and 3, moves with its apex the follower roller 63 supported upon an arm 64 integral with the print mechanism supporting arm 46 and in so doing thrusts said arm 46 downwardly against the tendency of compression springs 51, bringing the lowermost alignment of facets of the several printing discs 53 and 54 into printing engagement with the tape 65. This operation occurs after the inking roller 55 has covered the facets with a film of printing ink, thus enabling the reproduction of the registered number upon the tape 65 as in the manner indicated in Fig. 2.

When the apex of cam 62 passes engagement with the follower roll 63 and a low portion of the cam comes into registration therewith, spring 51 restores arm 46 to its normal position and the several number wheels 53 and 54 in traversing the arc from the printing position to the said poised or uppermost position, as portrayed in Figs. 1 and 3, are brought into engagement with a conventional type of number wheel advancing pawl 66. The latter member is pivoted on a shaft 67 in the bracket generally designated 59 and during this encounter one or more of its several projections 68, Fig. 3, engage related ones of the number wheels 53 or 54, causing them to be advanced one step after a manner well known in the art of decimal serial number wheel operating mechanisms.

Each number wheel 54 is provided with ten facets bearing the decimal integers from zero to nine in decimal order. In the intervening spaces between adjacent facets on each wheel there is provided a depressed surface as designated 69, see especially Fig. 4, in which there is formed a code combinational arrangement of shallow holes which identifies an associated facet. It is significant to note, however, that the facets which happen to be in printing position on the several wheels 54 are related to the code holes in the depressed surface in the position designated 71 approximately 120° counterclockwise of such facets.

Accordingly, as any number wheel is rotated and a succeeding facet thereof is moved into printing position, a succeeding depressed surface moves into the position designated 71. This relationship is provided especially to accommodate the particular arrangement of code sensing apparatus consisting of the five sensing feelers 72, Figs. 2 and 3 which are levers varying in size, all pivoted on a common shaft 73. These levers are angularly bent so as to afford portions extending upwardly and leftwardly, Fig. 3, and other portions extending horizontally whereat they are engaged by a corresponding set of five translating levers 74.

Individual springs 75 of the distensible type urge the several levers 72 to assume their respective counterclockwise positions, Fig. 3. Each of the levers 72 is provided with a horizontal bar section 76, Fig. 5, which extends across the width of the four number wheels 54.

Between the several horizontal bar sections 76 of the levers 72 and the point at which they register opposite the depression positions 71 of their related number wheel 54, there is disposed a rectangular frame 77 which gives support to a set of five feeler pins. These pins are equipped with return springs so as to normally seek their retractile positions. However, during the movement in a counterclockwise direction of the several levers 72, the bars 76 thereof engaging their associated pins move said pins into holes or code openings in the depression surface 71 of the particular number wheel with which the supporting frame 77 is then in horizontal registration or when no such code hole is found they so move to a position short of that just described whereat they are blocked. It will be observed from Fig. 5 that the several feeler pins of member 77 are staggered in terms of horizontal alignment so as to be in an individual lateral registration and hence accessible by one of the several horizontal sections 76, see Fig. 5. The group of pins is also arranged in two vertical rows, as best indicated in Fig. 5.

The feeler pin supporting member 77 which carries the five spring loaded sensing or feeler pins is itself mounted upon a horizontally shiftable carriage 78, Fig. 1, slidable upon two parallel guide pins 79 and movable through the means of a plunger rod 81. Plunger 81 is spring loaded as at 82 in order to seek its extreme rightward position, Fig. 4, except when urged in the opposite direction by the bell crank lever 83 which is pivoted at 84 upon a supporting casting that rises from the platform 49 intermediate the two parts of the transmitting unit afore-described. A cam follower pin 85 integral with the bell crank lever 83 follows the periphery of a four-level shift control cam 86 during the rotation of which said plunger 81 and its integrally associated supporting carriage 78 are shifted laterally in four corresponding movements.

Adjacent cam 86 which controls the lateral shifting of the number sensing mechanism there may be noted a supervisory cam designated 87 whose periphery is followed by a pin 88 extending from a third class lever 89 pivoted at 91. The working extremity of lever 89 extends beneath an arm 92 that ranges generally towards the right and upwardly from the yoke 56, Figs. 1 and 3.

According to the disposition of lever 92, as governed by cam 87 and lever 89, there is determined the disposition of yoke 56 and with it ink roller 55 for the purpose of treating the facets with an ink film as already described above. According to the contour of cam 87, as best revealed by the curve designated 87, Fig. 7, the movement of the ink roller 55 is of but short duration. After a number is imprinted upon the tape, as already explained, the number wheel sensing apparatus including portable carriage 78 begins its code sensing movements traveling from an extreme left-hand position, as best indicated in Figs. 1 and 5, in four successive steps until it achieves an extreme right-hand position. During each position, the several levers 72 are caused to be disposed in a characteristic manner according to the nature of the code combination sensed or in correspondence with the perforations found in the four positions, then situated in the alignment 71. This code setting is then imparted to a corresponding set of transfer bars 74 and through the latter members a signal is generated by the operation of cam assembly 26 as shaft 18 undergoes its cycle of rotation.

The code translations are communicated by means of the set of transfer levers 74 held apart by spacer sleeves 93 and pivoted on the common shaft 173, to the transmitting goosenecks of transmitter unit 37, mentioned above. This translation is achieved by the disposition of the lowermost extremities 94 of the afore-mentioned levers 74 which may be such as to block or pass the rightward extremities 95, Fig. 5, of the transmitter bell cranks of unit 37. Thereafter when the cam assembly 26 undergoes its cycle of rotation it presents a recess 96 in each of a set of five cams spirally offset from one another to the follower lobe extremities 97 of its associated gooseneck levers. There will accordingly be permitted or prevented the movement of said goosenecks in a counterclockwise direction about common pivot shaft 98 accordingly to the effective disposition of lever extremities 94 causing the related contact pairs 99 to be opened or closed and thereby issuing over the communication line a signal impulse after the manner of conventional start-stop signal transmission.

During the time that tranmission is under the control of the number code transmitter 37 it is necessary to suspend further operation of the primary tape transmitter 36 and for this purpose the contact pair 101 is provided which is also under the supervision of bell crank 41 and is opened thereby at the same time that contact pair 43 is closed. In the detailed description of operation to follow hereinafter there will be set forth the general operation and featuring also these various supervisory electrical control elements in connection with the detailed circuit description of Fig. 6.

Referring now again to the coded depression areas 69 which intervene the printing facets of the several number type wheels 54, it will be noted that each depression provides a rectangular field in which five code holes may be permutably located. These holes, as has been said, constitute a permutation code combination related to an integer located at some distance (about 120°) beyond on the periphery of the number wheel which distance is represented by the angle between code sensing position 71, Fig. 3, and the lowermost facet of the number wheel then in readiness for the printing operation.

This type of code signal transmission is fundamentally identical with the code signaling system supervised by the principal transmitter 36 and hence at a receiving station the same printing apparatus which is utilized in reproducing the message may also be employed in reproducing the identification serial number. However, as will be explained later, special apparatus is contemplated also under the control of periodic supervision for effecting a routing of the number signals to a special printer mechanism for reproducing the printed characters of the serial number in a manner identical to that used at the transmitter.

It has been stated that the message transmitter 36 is under the control of tooth clutch 27 which is cyclically brought into engagement when the trip lever 29 is withdrawn upon energization of magnet 32. During each cycle of rotation of the cam assembly 25 which pertains to the message transmitter 36, a certain cam 102 carried thereby, presents its notch 103 into registration with the follower projection 104 of a lever 105 pivoted on shaft 106 along with the several transmitting goosenecks pertaining to the unit 36.

As a result of the counterclockwise movement of said lever 105 under the influence of its individually associated coil spring 107, see also Fig. 4, it carries with it the pivot pin 108 by which there is pivotally articulated to it the stepping pawl 109. The latter member is maintained in its clockwise extreme position with respect to pivot 108 by means of a coil spring 111, one end of which is secured to a spring post carried by pawl 109 and the other end of which is secured to a similar spring post located at 112 in the foreground lever, Fig. 1, which is pivotally carried upon the said shaft 106. In thus moving upwardly lever 105 causes pawl 109 to be withdrawn from engagement with a particular tooth or ratchet wheel 113 and to slip into engagement with a succeeding tooth thereof so that when the high portion of cam 102 returns to engage projection 104, lever 105 will be thrust downwardly and moved in a clockwise direction to resume the position illustrated in Figs. 1 and 4, the tooth of pawl 109 imparting clockwise rotation to ratchet wheel 113 and rotating with it its integrally associated shaft 114.

As a consequence the torque spring 115 becomes wound in a clockwise direction as aforesaid, storing a counterclockwise force in the assembly including shaft 114 and wheel 113 which will be dissipated when the pawl 109 as well as the holding pawl 116 of the foreground lever 117 become withdrawn as will be explained later. Meanwhile, the forward thrust of feed pawl 109 causing clockwise rotation to the ratchet wheel 113 raises the holding tooth 116 until it passes over a succeeding tooth of said wheel 113 and descends behind it to maintain the assembly in advanced position. After three such steps have been consummated, sufficient clockwise rotation will have been imparted to the ratchet wheel 113 to cause its cam projection 118 to engage the lobe of a first class follower lever 119 and impart counterclockwise rotation thereto, rocking the latter member about its pivot shaft 121 and closing the contact pair 120 for a purpose which will be described later.

The release and restoration of shaft 114, Fig. 1, and the withdrawal of cam 118 from lever 119 and from the contact pair 120 is consummated under the control of lever 117, mentioned above, which is provided with a transverse bar 122 which overlies the horizontal sections 123 of the several bell crank levers, Figs. 4 and 5, pertaining to the gooseneck transmitters of unit 36 as well as the horizontal arms of companion levers 124 associated one with each gooseneck and pivoted on the same shaft 106 with them. Upstanding projections 125 integral with said levers 124 are in transverse alignment with offset portions 126 of the levers 127 integral with the feeler arms 38 as is clear from Fig. 1.

When any one of the feeler levers 38 is disposed in its clockwise or spacing position its blocking projections 128 and 126 are interposed to prevent the counterclockwise movement of associated gooseneck and companion levers while when any of such feeler levers 38 is disposed in its counterclockwise or marking position such blocking extremities 126 and 128 are withdrawn from overlying the extremities 125 and 129 of their respective lever arms.

Of the several gooseneck levers 130 and their companion levers 124, it is to be noted that the former are provided with intermediate cam follower projections 131, Fig. 1, while the latter are not so equipped. As a consequence, the companion levers 124 will be permitted to rise under the influence of their individually associated springs 107 immediately following the withdrawal of a universal bail 132 common to the several levers 124 and provided for the purpose of determining the instant of their rise. The gooseneck levers being provided with intermediate projections 131 are permitted to rise when not blocked by the feeler lever extremities 128 and then only at an individual instant in the cycle of rotation of shaft 18 in accordance with the distribution of notches in the several cams, each of which is provided with a recess similar to recess 103 of cam 102.

By carefully observing Figs. 1 and 4, it will be noted that the transverse or universal bar 132 is located just above and slightly clearing the uppermost edges of the several horizontal arms of levers 124. Contrasting therefrom, the bar 132 is spaced by a considerable margin from the upper edges of the horizontal arms of the several goosenecks. Accordingly, it will be understood that during the time that bar 132 is held in its lowermost position, that is, during the time that the extended apex periphery of the cam 133 registers with the follower projection 134, Fig. 4, the levers 124 will not be permitted to rise regardless of the disposition of the several feeler levers 38. However, during the time that said cam 133 is disposed so as to register its low portion or notch opposite the follower projection 134, a spring acting on bar 132 maintains said bar above the arm of levers 124 permitting a sufficient clearance so that thereafter any one of said levers 124 whose projection 125 is not blocked by the interposition lock of its associated feeler lever body 127 will be permitted to rise to a sufficient extent to engage and move the horizontal bar 122.

When a signal is received whose component impulses include at least one marking characteristic, the associated feeler lever or levers 38 will be moved counterclockwise and, as a consequence, the related lever or levers 124 will be permitted to rise and move the horizontal bar 122 releasing as it does so shaft 114 and ratchet wheel 113 from its advanced position which it may have achieved due to previous successive operations of the feed pawl 109. However, until a signal other than an all-spacing signal is received, a succession of such all-spacing signals will result in the advancement of cam surface 118 to the contact operating position whereat it will remain since further reciprocal movement on the part of pawl 109 is not effective due to the limited number of teeth in said ratchet wheel 113. The control of bar 122 over the ratchet wheel 113 is attained through a trip ledge 135 integral with lever 117.

Upon this ledge 135 there rests a forward arm 136 integral with pawl 109. Accordingly, the upward movement of bar 122 not only withdraws the latching tooth 116 but through ledge 135 carries with it pawl 109 thereby freeing the ratchet wheel 113 as aforesaid and permitting the latter member to rotate back in a counterclockwise direction until its pin 137, Fig. 4, encounters the stop 138. Thus, there is effected a selective performance on the part of the levers 124 under the control of feeler levers 38 depending upon the receipt of all-spacing signals on the one hand or signals of the remaining class on the other hand.

Between the five feeler levers 38, Fig. 1, there is disposed a tape feed sprocket wheel 139 carried by a shaft 141 integrally associated with a ratchet feed wheel 142. Rotation in a counterclockwise direction is imparted to this assembly by a reciprocally movable feed pawl 143 which is pivotally carried as at 144 by a reciprocating power arm not visible in the instant illustration but patterned generally after the manner shown in the transmitter patent referred to above.

As step-by-step rotary motion is imparted to the ratchet wheel 142, its position is retained by a spring-urged detent lever 145 pivoted as at 146 to a stationary part of the framework 147. Lever 145 is spring loaded and includes three arms, one of which 148 carries the detent pin 149 that rests in the teeth of sprocket wheel 142 during its advancement, while another arm of said lever designated 151 juts downwardly and leftwardly so as to be disposed behind a tail portion of pawl 143 so that upon clockwise movement of said lever 145 arm 151 engaging said tail portion will rock the pawl 143 out of engagement with the teeth of ratchet wheel 142 at the same time that pin 149 is withdrawn from engagement therewith. Control over lever 145 is had by a downwardly depressible push bar 152 which is supported for slidable movement opposing its return spring 153 and performing, in addition to this function on the part of its pin 154 which engages the third arm of said lever 145, a supervision over a trip lever 155.

In rotating trip lever 155 clockwise about its pivot 156, push bar 152 operates in the same manner as is explained in the patent referred to, releasing the extending end 157 of a horizontal arm integral with the endmost one 150 of the series of transmitter gooseneck control levers. The closure of contact pair 120 follows after three successive all-spacing signals are transmitted by the unit 37. Accordingly, it will be understood that the supervision exercised by this contact pair is contingent upon a prerequisite of three consecutive all-spacing signals and as a result of its operation, there will be caused the operation of a relay 264—265 for a purpose which will be described later.

Figure 10:
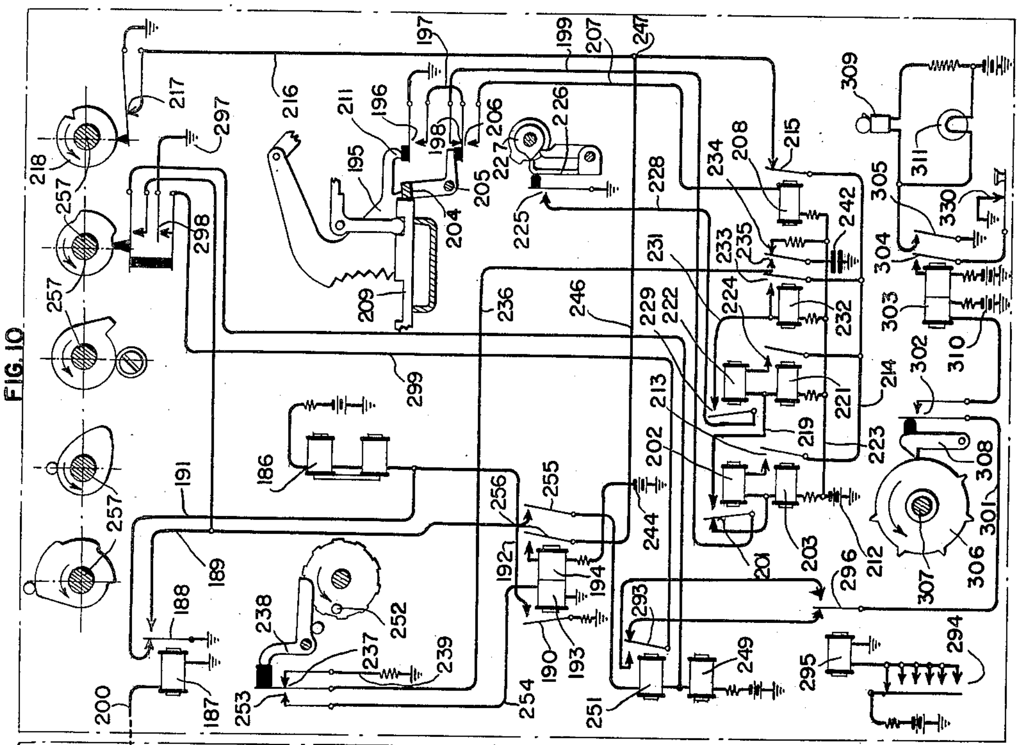
Fig. 10 is a schematic wiring diagram of a control circuit which may be utilized in the supervision of the receiving station apparatus featured in Figs. 8 and 9.
Figure 6:
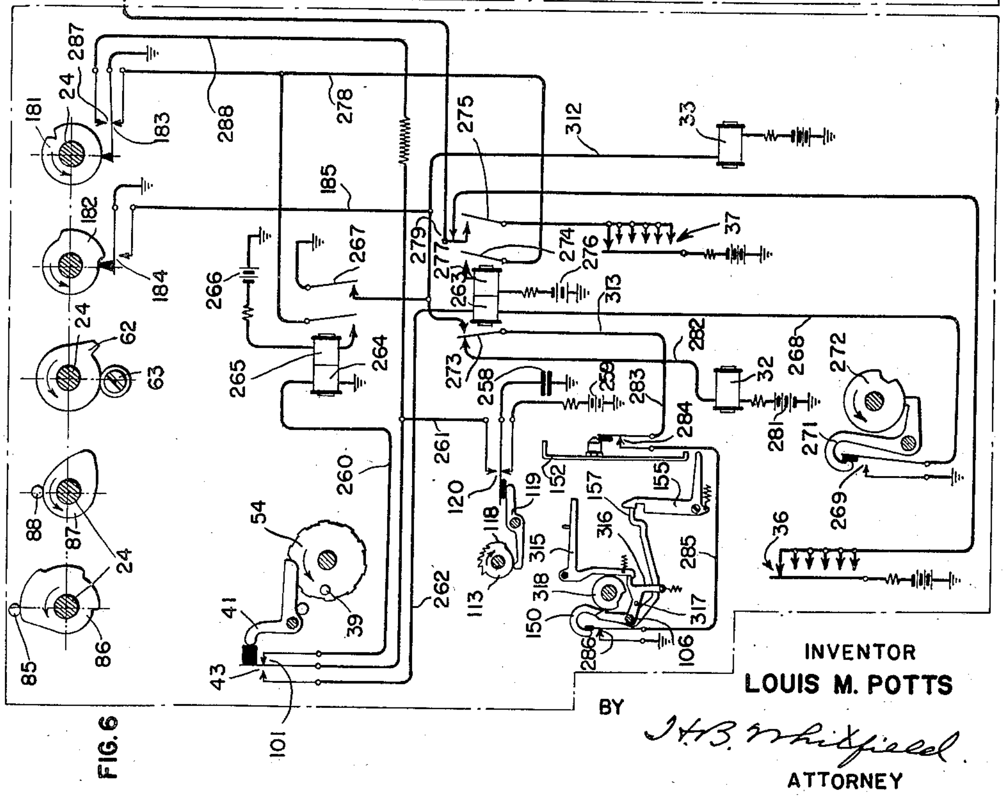
Fig. 6 is a schematic wiring diagram featuring certain elements of the apparatus symbolically.

The afore-described tape feed mechanism is actuated by a cam forming part of the assembly 25 and is accordingly supervised by the tooth clutch 27 and during the interim of its actuation, message signals are issued out over a line 209, Figs. 6 and 10. Signal transmission, under the supervision of the transmitting apparatus 36, prevails for the major portion of the communication time since this apparatus is instrumental in generating signals which relates to the subject matter of communications. Accordingly, magnet 32 remains energized and its lever 29 is withdrawn during most of the transmission time when a circuit for energizing magnet 32 is completed as traceable in Fig. 6 from grounded battery source 281 through the winding of magnet 32 over conductor 282 to the contact point 273 and grounded armature of de-energized relay 263—277. When this circuit is broken due to the energization of relay 263—277 which occurs as a result of the operation of supervisory pin 39 on the number wheel 54, contact pair 43 is closed and a circuit for energizing magnet 33 is completed through the same grounded armature of relay 263—277 when the latter becomes energized. Further consideration of the control and operating circuits of the system will be had in the description of operation following.

During the course of message signal transmission, the several feeler levers 38 are cyclically withdrawn from their extreme counterclockwise position by a restoration bar or bail 166 which is integrally associated with a lever arm 167, Fig. 1, urged in a clockwise direction by the spring 168 and opposed thereto by an appropriate cam forming part of the assembly 25.

A similar restoration bail 171, Figs. 1 and 5, is provided for collectively restoring the several transfer bell cranks 74 of the message number transmitter 37. In the case of universal bail 171, however, a principal difference obtains in respect to the structure of its power transmitting levers 172 and 174 the former of which is spring urged in a counterclockwise direction, Figs. 1 and 5, about its pivot 173 and provided with a follower roller 175.

Bail 171 which serves the purpose of restoring the several message number transmitting levers 74 is pivoted on shaft 173 and is controlled in a significant manner by the pair of levers 172 and 174. Both levers 172 and 174 tend through their spring influence to impart counterclockwise rotation, Figs. 1 and 5, to the restoration bail 171, which affects the several transfer levers 74. Cam 177 which acts upon lever 172 through roller 175 is provided with an extensive apex section that coincides with approximately two-thirds of its full cycle. During the remaining period or one-third of the cycle, cam 177 is undercut so that the spring of lever 172 may, during such interval, impart counterclockwise rotation to the restoration bail 171. During the one-third cyclic period of shaft 24 when follower roll 175 is permitted to drop and thus allow the spring to move lever 172 counterclockwise, bail 171 is held so as to be free of the other control lever 174 which is under the influence of cam 179. During the remaining portion or two-thirds of the cycle of shaft 24, such lever 172 is held away from engagement and, therefore, cam 179 acting through roller 178 and lever 174 may operate the bail 171 in the regular manner of signal transmision and thus effect the periodic restoration of them four times coincident with two-thirds of the cycle of shaft 24. This number corresponds to the periods during which there are transmitted number signals from the four numerical wheels 54.

Two contact operating cams 181 and 182 are also carried upon shaft 24, these operating upon the contact assemblies generally designated 183 and 184, Fig. 3. Cam 182, acting through its contact pair 184, supplies ground to a circuit 185 for maintaining energized clutch release magnet 33 when its initial operating relay 264—265 opens, as will be explained later, and cam 181, acting upon contact assembly 183, removes ground from its lower contact point momentarily and applies it to its upper contact point for a purpose which will be explained later.

In the foregoing, there has been described mechanical details and there have been introduced the specific functions of the several portions of a tape controlled transmitting apparatus having embodied therein a numbering stamp in accordance with the present invention. In cooperation with apparatus of this class, it is contemplated that at a receiving station there be provided mechanism for producing marking indicia upon a perforated tape in identical manner as it is undergoing preparation under the control of the signals issued by the transmitting apparatus. There will accordingly now be described in detail the structural features and apparatus of the receiving station apparatus, having particular reference to the drawings, Figs. 8 and 9. This apparatus is intended for use in connection with a receiving perforator, printer, or any other type of recorder symbolized in Fig. 10 by the relay 186.

Incoming line signals over line 200 are impressed upon a primary signal receiving relay 187. This member controls an armature 188 that fluctuates between a pair of contact points which connect to the lines 189 or 191. Line 191 in addition to its connection with the recording apparatus magnet 186 extends also to a secondary ground supply source at the left-hand contact 190 of a double wound relay comprising the windings 193 and 194. As will be again observed, ground supply through armature 190 will serve as a shunt to minimize the recorder magnet 186 to the secondary impulses of relay 187 during certain certain times when it becomes preferable to do so, such as while the number comparison operation is occurring. The signal receiving apparatus, which is symbolized also by the universal lever 195, through an added projecting arm 211, effects the closure of a contact pair 196 coincident with each signal operation. Accordingly, with each signal operation and the consequent closure of contact pair 196 ground is placed upon a conductor 197 traceable through the contact pair 198, conductor 199, back contact 201 of a relay 202, through the winding of a counting relay 203, to grounded battery 212.

In the recording apparatus, there is provided a universally operable bail 204 which forms part of a bell crank pivoted at 205 and having an arm for operating the contactor which forms one element of the afore-described contact pair 198 and upon being moved downwardly forms an element of the contact pair 206 extending ground thereby from the source initiated by the contact pair 196 alternatively to the aforedescribed first counting relay 203 or over the conductor 207 to the counting dump relay 208.

Universal bail 204 is spring urged so as to seek its counterclockwise position, as illustrated in Fig. 10. However, when any one of a set of five code bars 209 becomes displaced rightwardly, due to a marking characteristic, the universal bail and its integrally associated bell crank function to move the contactor downwardly closing contact pair 206 and establishing the afore-described alternative circuit condition. It is to be noted that the set of code bars 209 all assume the left-hand position and operate the counting relays only in response to all-spacing signals and that during any other of the signals one or more of said bars 209 will cause the aforedescribed universal bail operating function to operate and release all counting relays.

Member 195 is a part of the perforator function bail or in the case of a printer, this element finds its counterpart in the printing hammer or print bail. Its projection 211 operates to close the contact pair 196 at about the middle of the perforating or printing operation. This performance will, therefore, follow the particular placement of universal bail 204 and will in the event of an all-spacing signal direct an impulse for energizing the first counting relay 203 and in the event of any other signal will correspondingly operate the aforedescribed dump relay 208.

In accordance with a proposed practice, each complete message will be followed by three all-spacing signals for achieving the conditioning of apparatus which will now be described. It has already been noted how the first one of said signals places the universal bar 204 in the position indicated in Fig. 10 to operate the first counting relay 203. Following the momentary closure of contact pair 196 there will result the operation of adjacent relay 202 traceable from grounded battery at 212 through the winding of relay 203, through the winding of relay 202, through the contact pair 213 which is closed during the momentary energization of counting relay 203, thence over line 214, contact pair 215 of relay 208 now closed due to the de-energization of said relay, line 216 through the contact pair 217 now closed because it is currently subject to the extensive apex of cam 218, to ground.

As a result of the energization of relay 202 its lone contactor is withdrawn from its back contact point and attracted to its front contact point thereby establishing a new impulse path which extends from line 199 so that upon the receipt of the second all-space signal the impulse will be traceable over line 219 through the winding of second counting relay 221, thence to grounded battery at 212. As a result of the energization of counting relay 221, its adjacent relay 222 becomes energized over a circuit traceable from grounded battery 212, line 223, winding of the second counting relay 221, thence through the winding of its associated relay 222, contact pair 224 now closed due to the energization of relay 221, line 214, contact pair 215 which is now closed due to the de-energization of relay 208, line 216, and contact pair 217 to ground. When an impulse is received over line 199 as described, only relay 221 is instantly energized but when the impulse terminates, companion relay 222 is operated because at that time ground is removed from lead wire 199 which had been shunting out winding of relay 222 and a new ground supply is simultaneously made available through the closure of contact pair 224 over lines 214 and 216 as will be obvious.

Upon the advent of the third all-spacing signal, the operation of contact pair 196 is itself ineffectual but instead a contact pair 225 operated by a lever 226 under the control of a cam 227 carried by the receiving apparatus selector sleeve and normally serving only to release the operating shaft, establishes ground over a line 228 through the contact pair 229 of relay 222, now energized as a result of the energization of the second counting relay 221, thence over line 231, winding of the third counting relay 232, line 223 to grounded battery at 212.

As a result of the energization of the third counting relay 232 it locks itself due to the closure of its first contact pair 233 which establishes an alternative ground supply source over line 214, contact pair 215, line 216, contact pair 217, to ground under the supervision of cam 218 as aforedescribed.

As a further result of the energization of relay 232, its secondary armature is drawn up breaking connections with contact point 234 which leads to grounded battery 212 and establishing connection instead with contact point 235. This extends over a line 236, contact pair 237 due to the relaxed condition of bell crank 238 which corresponds to the bell crank 41 in the transmitter apparatus, thence over a line 239 to ground.

As a result of the afore-described operation a condenser 242 which receives a charge during the normal condition of the secondary armature of relay 232 in contact with its right-hand point 234, now discharges to ground dissipating itself so as not to be effective except under the one prerequisite that the number stamp be disposed with its pin 252 actuating bell crank 238. This condition has been chosen in order that the test comparisons be limited in frequency of occurrence to once in ten. Obvious rearrangements may be had to accommodate for more or less frequent comparisons if such variation is deemed preferable.

In the event that pin 252 is so disposed as to operate bell crank 238 at the time the third counting relay 232 becomes energized and closure is made between the contact pair 253 instead of the contact pair 237, the impulse from condenser 242 will be routed over line 236, contact pair 253, line 254, to the energizing winding 193 of a double wound relay whose other winding 194 thereupon constitutes a lock by drawing up its armatures 255 and 256. Armature 256 is a locking armature and completes a circuit from grounded battery 244 through the winding 194, armature 256, line 246, to the junction 247, thence over line 216, closed contact pair 217 to ground. Armature 255 functions to subject magnet 249 and relay 251 to the supervision of line relay 187.

The numbering apparatus at the intermediate or receiving station, Fig. 10, is provided with supervisory cams on its cam controlled shaft 257 just as in the case of the transmitting station tape numbering stamp. At a time when the number signals are transmitted apparatus is initiated at the receiving station for effecting a comparison between its own numbering apparatus and the particular incoming members' signals whereupon, if the comparison designates a discrepancy among the integer signal components, there is sounded a special alarm apparatus at the receiving station apprising the attendant thereat accordingly. On the other hand, when the comparison is proper and the incoming signal corresponds to the condition of the number apparatus at the receiving station, then no such alarm condition is initiated and message transmission may continue unabated.

Bearing in mind that the system contemplates successive numbering of messages under the supervision of local number wheel advancing apparatus at each station, it is to be noted that the initiating of each numbering operation depends upon the transmission by the sending station, Fig. 6, of three all-spacing signals after which the apex of ratchet wheel 113 causes lever 119 to discharge a condenser 258, which is normally receiving a charge from grounded battery 259, over line 261, contact pair 101 which is now closed during the absence of pin 39 at the point of engagement with bell crank 41, thence over line 260 to the operating winding 264 of a double wound relay which thereupon energizes its locking winding 265 by placing locking battery 266 upon an obvious circuit thereafter dependent for release upon contact pair 183 and its influence by the cam 181. As a further result of the energization of relay 264—265 it draws up its armature 267 placing ground upon the obvious energizing circuit for start magnet 33 of the transmitter station message number transmitting apparatus.

It will be recalled that the energization of start magnet 33 couples the clutch elements of unit 28 and in addition to rotating the transmitting cam distributor 26 also imparts rotation to shaft 24 which thereupon enters into a cycle of operation during which six signal intervals are consumed and six number signals are transmitted out over line 200. As a further consequence of the energization of the number transmitting magnet 33, the number transmitting unit 37, Fig. 6, may become effective to transmit permutation code signals in accordance with the integer components of the particular number, provided that pin 39 is then in engagement with bell crank 41. As a result of the latter condition, contact pair 43 becomes closed in lieu of contact pair 101 so that the discharge from the condenser 258 is thereafter routed over wire 262 to the energizing winding 263 of a double wound relay, thence over line 268, contact pair 269 of a gooseneck lever 271 which is under the control of a special cam 272 on the message transmitter cam assembly sleeve 25 and is located angularly so as to establish the energizing impulse for winding 263 at a period in the signal cycle near the end of the interval, to ground.

As a result of the momentary energization of winding 263 it pulls up its several armatures 273, 274 and 275. When armature 274 closes, locking battery from source 276 is placed upon secondary or locking winding 277 completing a circuit traceable over line 278 to the afore-mentioned grounded contact pair 183 which is under the supervision of cam 181. As a result of the drawing up of armature 275, a make-before-break contact assembly 279 is operated whereupon the transmitter 37 is electrically extended over line 200 at the same time that the message transmitter unit 36, Fig. 6, is disconnected therefrom.

As a result of the operation of armature 273, relay 263—277 opens the circuit for energizing the message transmitter clutch start magnet 32, traceable from grounded battery 281, through the winding of magnet 32, line 282, back contact and armature 273 of relay 263—277, lines 313 and 283, contact pair 284 which is under the supervision of manual push-bar 152, line 285 and contact pair 286 which is closed during the time that a supply of tape or control form is available in the transmitter, to ground.

The just described opening of this circuit at contactor 273 de-energizes magnet 32 and thereby suspends further the transmission of message matter over line 200 and through the make-before-break contact set, by cutting off this transmitter from the line. The noted condition, under the supervision of relay 263—277, prevails for a considerable period of the cycle of shaft 24, as may be observed by referring to Fig. 6 and noting the contour of cam 181 which controls the lock circuit of this relay. When the low portion of cam 181 arrives at the follower of its contactor, then for a brief interval contact pair 183 is broken, removing the ground which had been holding energized the windings 265 and 277 of the respective relays and momentarily establishing an electrical connection at contact pair 287. As a result of the de-energization of relays 264—265 and 263—277, their respective armatures are permitted to fall back and the make-before-break contact set 279 is restored to the condition indicated in Fig. 6. Although relay 263—277 is de-energized by the afore-described operation of cam 181, magnet 33 which has been subordinated to it through the function of its armature 273, is nevertheless maintained energized because shortly preceding the effectiveness of cam 181, the apex of cam 182 encounters its follower contactor of contact pair 184 introducing ground over line wire 185 to take the place of the ground theretofore supplied through the armature 273. As a result, magnet 33 is maintained energized notwithstanding the removal of ground due to the relaxation of armature 267 of relay 264—265 and to the termination of ground supply over the energizing source due to the relaxation of armature 273. Thus, during the final one-third revolution of shafts 24 and 257 the rotation is continuous since no stop time is inserted as was the case during the first two-thirds revolution. The resulting continued effectiveness of clutch 28 permits the rotation of shaft 24 to go on until it is restored to its zero position which is that featured in Figs. 1, 2, and 6.

The message transmitter need not wait until all this has been achieved but instead signal transmission from unit 36 may be resumed without waiting until shaft 24 is normalized. Message matter transmission thereupon resumes following the relaxation of armature 273 which restores ground to the circuit including lines 282 and 283, and the contact pair 286 to ground. At this time, magnet 32 again becomes energized and starts the rotation of the cam assembly 25 of the message transmitting unit.

Upon sensing the first signal of a succeeding message which, in all probability, will be a signal other than the all-spacing signal, one or more of the feeler levers 38, Fig. 1, will be permitted to rise correspondingly displacing its feeler lever body portion 127 and removing the obstruction lugs 126 and 128 from above their related member projections 123 and 125, Figs. 1 and 4. The consequent counterclockwise movement on the part of one of the levers 124 will lift the bail 122 and through its underhanging lip 135 thereof will cause the feed pawl 109 to be withdrawn at the same time that the holding pawl 116 is also withdrawn from the ratchet wheel 113. This frees the latter member to respond to the urge of its torque spring 115, Fig. 1, and be restored in a counterclockwise movement about shaft 114 until it achieves zero position, as indicated in Fig. 4, with pin 137 engaging the stop 138. At this lever 119 resumes its original position as shown in Figs. 4 and 6 whereupon the contactor of storage condenser 258 is withdrawn from its upper contact point and returns to its lower contact point, receiving as it does so a new charge from battery 259. Condenser 258 thereby becomes ready for a subsequent operation while message transmission over line 200 continues from the transmitter 36 after the manner which is conventional in accordance with the operation of the transmitter disclosure in U. S. Patent No. 2,296,845 above.

The practice is proposed of sending three all-spacing signals following each message and as a consequence there will result the operation of control shaft 24 and the printing of a serial number on the prepared tape. Once in the course of ten consecutive number printings, the pin 39 encounters the lever 41 and initiates the transmission of a signal indicative of the number associated with the tenth message. At the receiving station, the effect of such transmitted signals originating with the special number transmitter 37 will now be explained.

In response to the three all-spacing signals as has already been described above, there is established at the receiving station, Fig. 10, the energization of supervisory relay 193—194 placing the magnet 249 and relay 251 under the supervision of line relay 187 and responsive thereafter to the fluctuations of its armature 188. Also, it will be recalled, that the local printer or reperforator apparatus is held in abeyance due to the operation of armature 190 maintaining marking current upon the control magnet 186 thereof. If, at this time, the receiving apparatus is in proper step with the transmitting apparatus and pin 252 of the unit's integer wheel has duly operated lever 238, contact pair 253 will be closed and relay 193—194 operated, resulting in placing the reception circuit in readiness for the oncoming number signals which are then transmitted by unit 37.

Figures 7, 9:
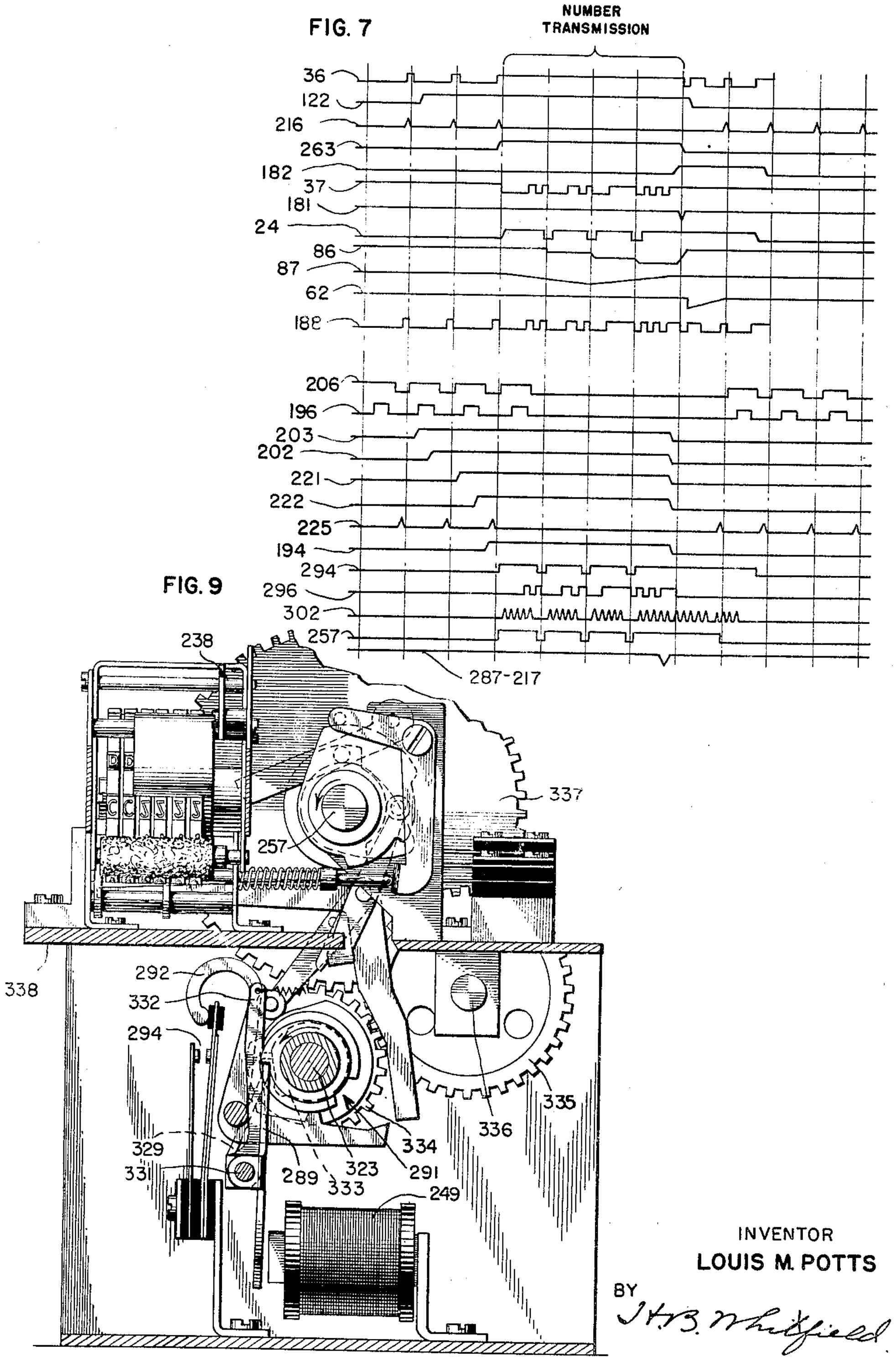
Fig. 7 is an operational curve chart from which there may be obtained detailed information concerning the periodic performance of various elements of the apparatus.
Fig. 9 is a transverse sectional view taken approximately on line 9—9 of Fig. 8.
Figure 8:
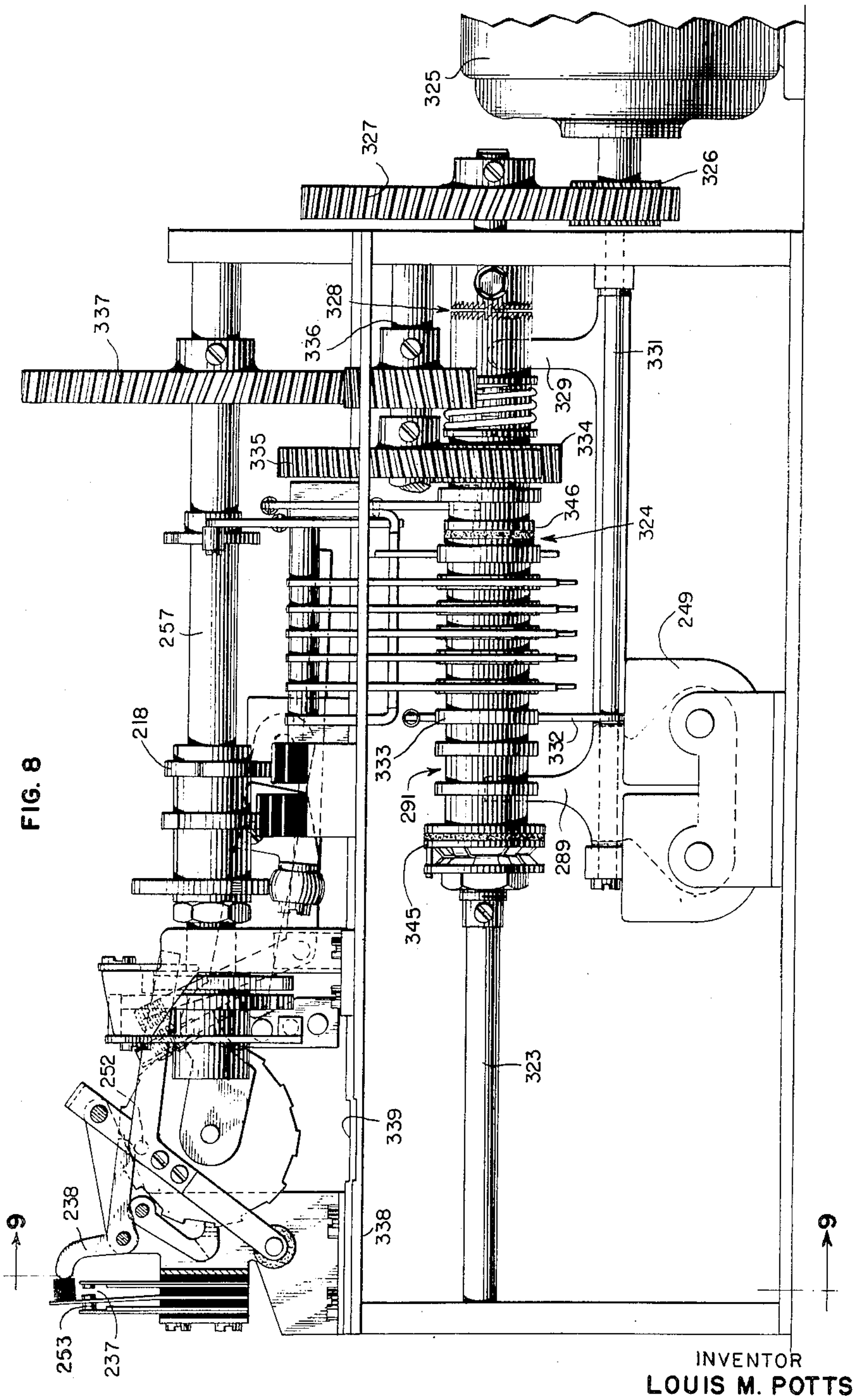
Fig. 8 is a side elevational view of a receiving station apparatus having embodied therein essential features of the present invention.

Upon receipt of the first marking impulse magnet 249 will become energized and as a consequence will attract its armature 289, Figs. 8 and 9, and will release to rotation the cam assembly 291 which consists essentially of a series of cams having a spiral disposition of notches just as in the case of cam assembly 26, Fig. 1. The timing of the receiving apparatus is such that cam assembly 291 will immediately begin rotation so that the presentation of the several successive cam notches to the transmitting gooseneck levers 292 will coincide with the received impulses over line 200 as they are manifest by the impressions upon relay 251 and the consequent fluctuation of its armature 293. As a result of the operation of the several gooseneck levers 292 signals will be transmitted over the set of transmitting contacts 294 causing relay 295 to become energized and de-energized coincidentally with relay 251. The signal impulse impressions upon relay 295 will cause fluctuations of its armature 296 and the two armatures 293 and 296 should, under ideal signaling conditions, fluctuate in unison simultaneously engaging their left and right-hand contact points in coordination with the signals impressed on the one hand over line 200 and on the other hand over the short line connecting transmitter gooseneck contact pairs 294 with their common magnet 295.

The two armatures 293 and 296 lie in a path from a ground source at 297 under the supervision of a contact pair 298 for extending ground over the lines 299 and 301, contact pair 302, the energizing winding 303 of an alarm relay which controls a locking armature 304 and a functional armature 305, to grounded battery at 310. Cam 306, carried by the receiving apparatus selector shaft 307, is provided with a set of apices each located so as to engage the follower lever 308 during the approximate center of its signal impulse interval, wheel 306 being divided into five parts in correspondence to the five components of a Baudot signal.

In accordance with this arrangement, therefore, if either one of the armatures 293 or 296 is disposed in a manner different from that of the other one of said armatures, indicating thereby a discrepancy between the incoming signals as manifest upon armature 293 and the locally generated signal as manifest upon armature 296, a circuit will be completed during the brief interval coincident with the center of a signal impulse when the apex of cam 306 corresponding to such discrepancy impulse engages lever 308 and causes the contact pair 302 to be closed. This momentary energization impressed upon winding 303 pulls up armatures 304 and 305, the former of which locks over an obvious circuit while armature 305 completes an obvious circuit for sounding the audible alarm 309 and lighting the visual index 311 designating to an attendant that a number discrepancy has occurred. The telltale devices 309 and 311 remain energized due to the lock-up condition of relay 303 but when the fact of error is thus brought to the attention of the attendant and the message disorder has been rectified, release key 330 is operated opening the locking circuit of relay 303 and the condition of Fig. 10 is thereupon restored.

When no discrepancy obtains as between the incoming numerical signal and that reproduced by the home recorder at the receiving station, the armatures 293 and 296 fluctuate in unison, both moving to the right and left at the same time and thereby failing to complete the circuit because, as will be noted, the left-hand contact point of armature 296 connects with the right-hand contact point of armature 293 whereas the left-hand contact point of armature 293 connects with the right-hand contact point of armature 296.

Calling attention now again to the transmitter station, Fig. 6, it will be observed that shaft 24 of the signal transmitting apparatus rotates counterclockwise completing a full revolution during the time that six signals are being transmitted by the transmitting apparatus, generally designated 37. To start shaft 24 into rotation, clutch 28 must be released and this depends upon the sensing of the three all-spacing signals. After shaft 24 has been started into rotation it may function merely to actuate mechanically the number stamp or it may also transmit a number's signal designating to the receiving station the integer composition of its currently stamped number. To do the latter, pin 39 must be in the position for actuating bell crank 41. If the number is transmitted then the number wheel sensing mechanism, which undergoes its mechanical code sensing operations, regardless of whether the signal is generated or not, steps from one number wheel to the next correspondingly disposing the transfer levers 74. The determination of whether this performance on the part of the code sensing mechanism is effective or idle is solely with the relay 263—277 which places the numbers transmitter 37 on the line in lieu of the message transmitter 36 or upon failing to become energized leaves the arrangement as shown in Fig. 6 with the message transmitter 36 connected to line 209 and operating to transmit a succeeding message.

Towards the conclusion of its cycle of rotation, and more precisely when shaft 24 has completed about two-thirds of its revolution, the recess in cam 181 encounters the follower of its contactor whereupon contact pair 287 is closed and contact pair 183 opened. As a result, ground which had been holding relays 264—265 and 263—277 closed is withdrawn permitting said relays to become restored to de-energized condition and this ground source is made available to insure the total discharge of condenser 258. Also, at the conclusion of the cycle of operation of shaft 24, the apex of cam 182 engages the follower contactor of pair 184 and places ground on a circuit for magnet 33. This maintains said magnet 33 energized after the release of relay 264—265 since clutch 28 must be maintained in engagement until shaft 24 has completed a full revolution.

During those instances when relay 263—277 becomes energized and pin 39 is in any position other than that engaging bell crank 41, armature 273 is drawn up establishing an energizing circuit from magnet 33 traceable from its own grounded battery through the winding of relay 33, line 312, contactor 273 and its right-hand contact point, lines 313 and 283, through the contact pair 284, line 285 through the contact pair 286, to ground. In this connection, it is to be noted that contact pair 286 is normally maintained closed and is under the supervision of a gooseneck lever 150 which maintains it in its closed position as designated in Fig. 6 except in the event that the tape in the transmitter runs out, whereupon a special sensing lever 315 probing for this condition is permitted to rotate counterclockwise releasing a trigger 316 to its spring which urges it in a clockwise direction so that when the recess in cam 318 registers opposite the follower node of said lever 316, a pin 317 carried thereby and extending sidewardly rocks the gooseneck lever 150 in a clockwise direction about its pivot 106 latching its tail 157 within the notch of bell crank 155. This end-of-tape sensing apparatus is fully disclosed in the above referred to patent to which reference may be had for a more elaborate disclosure.

Attention is directed again to Figs. 8 and 9 in conjunction with the diagrammatic illustration of Fig. 10. As with the transmitter, the receiving station message numbering machine is provided with two principal cam shafts designated 323 and 257. Shaft 323 corresponds to shaft 18 of the transmitting station apparatus in all essentials except that there is not used in this instance the corresponding equivalent to the message transmitting cam assembly 25, but only the equivalent of the number transmitting cam assembly, in this instance 324. Power is communicated from a prime mover 325 through a pinion 326 and driven gear 327 to the driving tooth clutch element of a clutch coupling 328 for rotating the drive pinion 334, and through the friction drive discs 345 and 346 to the cam sleeve assembly 291.

Positive tooth clutch coupling 328 is under the mechanical supervision of a clutch control lever 329 pivoted on a shaft 331, common to the friction clutch control armature 289 of the frictionally driven cam assembly 291. The actuator for clutch control lever 329 is an integral upstanding arm 332 which is released by one of the cams 333 of the assembly 291 after the latter has entered upon a cycle of rotation in response to the release of armature 289. Accordingly, it will be understood that while the primary control is with electromagnet 249 in performing the release function for cam assembly 291, auxiliary supervision is had over clutch 328 following invariably the release of sleeve 291. The driving gear 334 carried with the driven portion of said clutch 328 meshes with a driven gear 335 and thereby imparts rotation through a jack shaft 336 to the driven gear 337 of the number printing control shaft 257.

Aside from those elements of the receiving station numbering apparatus which were particularly noted in the foregoing detailed description of operation, the details of the various operating elements are essentially the same as the corresponding mechanism illustrated in Figs. 1 and 4 at the transmitting station. It will suffice to state, therefore, that this mechanism disclosed in Figs. 8 and 9, is provided with a platform 338 in which a channelway 339 is afforded corresponding to the channel 52 of the transmitting station apparatus, and that the perforated tape or printed form emanating from a reperforator or printing mechanism is suitably guided through this channel for receiving the markings from the receiving station number printer.

While the present invention has been explained and described with reference to a particular disclosure, it is to be understood, nevertheless, that numerous changes and modifications may be invoked without departing from the essential spirit or scope thereof. It is, accordingly, not intended to be limited by the particulars of the foregoing specification nor by the details in the accompanying illustrations except as indicated in the hereunto appended claims.

The invention claimed is:

1. Telegraph transmitting station apparatus comprising a permutation code signal message generating apparatus, a multiple integer numbering stamp, a control means initiated by concluding signals terminating a message by said message generating apparatus for initiating into operation said numbering stamp, and automatic means responsive to periodic ones only of a series of messages for generating permutation code line signals in accordance with the stamp numbers currently applied by said stamp.

2. A telegraph transmitting station comprising a permutation code message means, code signal generating apparatus, a multiple integer message numbering stamp, a control means initiated by concluding signals terminating a message by said message means for operating said numbering stamp, and automatic means responsive to periodic ones only of a series of number stamp operations for generating permutation code line signals in accordance with the integers of the numbers currently applied by said stamp.

3. In a permutation code transmitting apparatus, means responsive to the permutation code perforations in a control form for generating line signals permutatively conforming thereto in electrical characteristics, a multiple integer number apparatus, means for actuating said number apparatus in response to a signal designating predetermined periods in the operation of said line signal generating means, means for advancing said apparatus progressively following each operation thereof, and automatic means responsive to a predetermined periodicity in the operation for issuing permutation code signals corresponding to the numerical integers of said apparatus.

4. In a multiple message transmitting apparatus, means responsive to consecutive message perforations in a control form for generating line signals permutatively conforming in electrical characteristics thereto, a message numbering apparatus comprising a series of integer stamp wheels, means for actuating said numbering apparatus in response to a signal designating the conclusion of each message, means for advancing the integer reading of said stamp progressively following each operation thereof, and automatic means responsive to a predetermined periodicity in the operation of said number stamp for issuing permutation code signals to a remote station in accordance with the numerical integers of said stamp.

5. In a permutation code transmitting apparatus, a message numbering stamp comprising a series of integer bearing wheels supported on a common rotary axis, permutation code markings identifying each integer carried by said wheels and disposed in predetermined angular relationship to the integers identified therewith, means for generating permutation code signals in accordance with said wheels, and a code marking sensing apparatus including a supporting carriage and mechanism for advancing said apparatus parallelly to said axis so as to present said sensing apparatus successively in engagement with a transverse alignment of code markings on the several ones of said wheel.

6. In a tape transmitting apparatus, a numbering stamp comprising a series of decimal integer wheels each bearing integer stamping embossments and corresponding permutation code markings, means for generating permutation code signals in accordance with said permutation code markings, and a code marking sensing apparatus including a carriage movable from one of said wheels to another in succession and for universally communicating the code markings sensed to said signal generating means.

7. In a permutation code transmitting apparatus, a series of number wheels each bearing numerical integers from zero to nine, code combination markings identifying each one of said integers carried by said wheels, and a code marking sensing apparatus including a portable supporting carriage for said apparatus comprising a series of probes and mechanism for associating said probes with the code markings of each one of said wheels in predetermined succession.

8. In a permutation code transmitting apparatus, a series of decimal integer wheels each bearing numerical integer designations from zero to nine ordinally arranged thereon, code combination markings identifying each one of said integers carried by said wheels in corresponding arrangement, a sensing apparatus for said markings including a portable supporting carriage, a series of searching pins, and mechanism for associating said series of pins with the code markings of each one of said wheels in succession.

9. In a permutation code transmitting apparatus, a supervisory control shaft, a series of integer wheels each bearing code markings in accordance with numerical integer designations thereon, a transmitting distributor including electrical contact means for issuing permutation code signal impulses in accordance with the markings carried by said wheels, and a sensing apparatus including a supporting carriage actuated by said control shaft and means for successively presenting said carriage to each one of said wheels and for thereafter returning to a start position, said sensing occurring only at such times as said carriage is at rest.

10. In a permutation code apparatus, a supervisory control shaft, a series of integer wheels each bearing code markings periodically actuated by said shaft, a transmitting distributor including electrical contact means for issuing permutation code signal impulses in accordance with the markings carried by said wheels, a markings sensing apparatus, and a supporting carriage actuated by said control shaft having successive engagements with each one of said wheels and communicating its sensing to said distributor, said sensing occurring only at such time as said carriage is at rest adjacent to said integer wheels.

11. In a permutation code transmitting system, a signal impulse distributing apparatus, a set of contiguously placed wheels each bearing on its periphery various code markings in accordance with different character signals to be transmitted by said distributor apparatus, a sensing mechanism for determining the combination of the code markings on said wheels in accordance with the radial position of each, and a movable carriage device for supporting said sensing mechanism and advancing it successively into association with each one of said wheels, said sensing occurring only at such time as said carriage is at rest.

12. In a permutation code transmitting system, a signal impulse distributing apparatus, a series of wheels each bearing on its periphery several sets of permutational code markings in accordance with character signals, a single sensing mechanism for determining the character code markings on each of said wheels, and a carriage device for supporting said sensing mechanism and advancing it successively into association with each one of said wheels while maintaining communication with said distributor apparatus, said sensing occurring only at such time as said carriage is at rest adjacent to said integer wheels.

13. In a permutation code transmitting apparatus, a stationary signal distributing mechanism, a stationary permutation code bearing medium including a plurality of integer wheels having a plurality of different code signal positions cut in the periphery thereof, and a code sensing apparatus movable to engage said bearing medium in its different positions while maintaining communication with said distributing mechanism.

14. In a permutation code transmitting apparatus, a stationary signal distributing mechanism, a plurality of stationary permutation code bearing media each having various code combinations cut in the periphery thereof, and a movable code sensing apparatus to engage said media in successive step operations and for communicating the code combinations thereof to said distributing mechanism during each of said stepped operations.

15. In a permutation code transmitting mechanism, a set of permutation code transmitting contacts, a tape sensing apparatus responsive to the perforations in a control form for correspondingly conditioning said set of contacts, a rotary shaft for sequentially closing said contacts and generating permutation code signals in accordance with the conditioning of said contacts, a supervisory control shaft, a message numbering device including a series of integer wheels each bearing a series of different code markings, and a shiftable transfer apparatus for communicating the code markings from said numbering device's wheels to said transmitting contacts under the supervision of said control shaft.

16. In a permutation code transmitting mechanism, a tape sensing apparatus responsive to the perforations in a control form for correspondingly conditioning a set of permutation code transmitting contacts, means for generating permutation code signals in accordance with the conditioning of said contacts, a supervisory control shaft, a numbering device including a series of integer wheels each bearing code markings related to the integer characters on said wheels, and a shiftable transfer apparatus for communicating the code markings from said wheels to said transmitting contacts in accordance with the operation of said control shaft.

17. In a tape transmitting apparatus, a rotary distributor control shaft comprising a series of cams each angularly disposed to accord with an individual interval of a rotary cycle, a supervisory control shaft, means responsive to a predetermined succession of certain permutation code signals generated by said distributor control shaft for initiating into rotation said supervisory control shaft, a secondary transmitting mechanism, and means under the joint control of said distributor shaft and said supervisory control shaft for initiating said secondary transmitting mechanism.

18. In a permutation code transmitting apparatus, a primary signal impulse distributor, an operating shaft for said primary distributor, a supervisory control shaft, means responsive to a predetermined succession of permutation code signals issued by said primary distributor for initiating into rotation said supervisory control shaft, a secondary transmitting mechanism, and means under the joint control of said primary distributor shaft and said supervisory shaft for operating said secondary transmitting mechanism.

19. In a tape transmitting apparatus, a first transmitter, a second transmitter, a primary operating shaft for imparting rotary power to both of said transmitters, a secondary shaft clutch controlled means for communicating said power to each of said shafts selectively, means under the control of signals generated by said first transmitter for coupling the clutch to operate said second transmitter, a series of permutation code transfer elements associated with said second transmitter, a restoring bail for normalizing said transfer elements following each setting, and means for subjecting said transfer elements to the supervision of two control media comprising a spring loaded lever under cam control of said primary operating shaft for imparting cyclic rotation to said bail, and a spring loaded lever under supervision of said secondary shaft for withholding said restoring bail from its control cam.

20. In a telegraph transmitter, means to sequentially number messages for identification purposes, means to sense each number, means to transmit predetermined ones of said sensed numbers for comparison at a receiving station, and means to suppress transmission of sensed numbers other than said predetermined ones of said numbers.

LOUIS M. POTTS.

REFERENCES CITED

The following references are of record in the file of this patent:

UNITED STATES PATENTS

| Number | Name | Date |
|---|---|---|
| 781,194 | Elliot | Jan. 31, 1905 |
| 953,344 | Merckens | Mar. 29, 1910 |
| 1,275,559 | Houghtaling | Aug. 13, 1918 |
| 1,370,669 | Potts | Mar. 8, 1921 |
| 1,625,823 | Potter | Apr. 26, 1927 |
| 1,882,765 | Bryce | Oct. 18, 1932 |
| 1,972,326 | Angel | Sept. 9, 1933 |
| 2,046,381 | Hicks | July 7, 1936 |
| 2,102,719 | Kinkead | Dec. 21, 1937 |
| 2,117,052 | Bailey | May 10, 1938 |
| 2,193,809 | Dirkes | Mar. 10, 1940 |
| 2,193,967 | Kleinschmidt | Mar. 19, 1940 |
| 2,213,475 | Reiber | Sept. 3, 1940 |
| 2,248,822 | Quinley | July 3, 1941 |
| 2,304,120 | Potts | Dec. 8, 1942 |
| 2,340,809 | Hatton | Feb. 1, 1944 |